(12) United States Patent
Yoshioka (10) Patent No.: US 7,353,928 B2
(45) Date of Patent: Apr. 8, 2008

(54) TORQUE COUPLING ASSEMBLY WITH VENTING PASSAGE

(75) Inventor: Jun Yoshioka, Canton, MI (US)

(73) Assignee: Dana Automotive Systems Group, LLC., Toledo, OH (US)

( * ) Notice: Subject to any disclaimer, the term of this patent is extended or adjusted under 35 U.S.C. 154(b) by 217 days.

(21) Appl. No.: 11/239,429

(22) Filed: Sep. 30, 2005

(65) Prior Publication Data

US 2007/0074949 A1 Apr. 5, 2007

(51) Int. Cl.
F16D 25/02 (2006.01)
F16H 48/22 (2006.01)

(52) U.S. Cl. .............................. 192/85 AA; 192/103 F; 475/88

(58) Field of Classification Search ............ 192/103 F; 474/88
See application file for complete search history.

(56) References Cited

U.S. PATENT DOCUMENTS

| | | | |
|---|---|---|---|
| 4,059,026 A | 11/1977 | Stritzel | |
| 4,452,100 A | 6/1984 | Sullivan et al. | |
| 4,932,209 A | 6/1990 | Okada et al. | |
| 5,162,024 A | 11/1992 | Yoshiba | |
| 5,232,410 A | 8/1993 | Yanai | |
| 5,467,596 A | 11/1995 | Yu | |
| 5,473,964 A | 12/1995 | Okada et al. | |
| 5,611,746 A | 3/1997 | Shaffer | |
| 5,749,801 A * | 5/1998 | Teraoka et al. ............... 475/88 |
| 5,819,194 A | 10/1998 | Hara et al. | |
| 6,041,903 A | 3/2000 | Burns et al. | |
| 6,059,680 A | 5/2000 | Yoshioka | |
| 6,176,800 B1 | 1/2001 | Shaffer et al. | |
| 6,183,387 B1 | 2/2001 | Yoshioka | |
| 6,216,841 B1 * | 4/2001 | Hofer ..................... 192/103 F |
| 6,692,396 B1 | 2/2004 | Grogg et al. | |
| 6,699,151 B2 | 3/2004 | Grogg et al. | |
| 2002/0144851 A1 | 10/2002 | Porter | |
| 2004/0184942 A1 | 9/2004 | Phillips | |

* cited by examiner

Primary Examiner—Richard M Lorence
(74) Attorney, Agent, or Firm—Berenato, White & Stavish (57) ABSTRACT

A torque-coupling assembly comprises a hydraulic fluid reservoir provided for storing a supply of a hydraulic fluid, a hollow coupling casing rotatable by an outside drive torque, a hydraulic pump located within the coupling casing to generate a hydraulic pressure, a supply passage fluidly connecting the hydraulic fluid reservoir to a suction passage of said hydraulic pump and a venting passage. The venting passage is provided for operatively fluidly connecting the supply passage to an ambient atmosphere for selectively enabling or disabling the hydraulic pump.

19 Claims, 7 Drawing Sheets

TORQUE COUPLING ASSEMBLY WITH VENTING PASSAGE

BACKGROUND OF THE INVENTION

1. Field of the Invention

The present invention relates to torque-coupling assemblies in general, and more particularly to a torque-coupling assembly provided with a venting passage.

2. Description of the Prior Art

Many modern vehicles employ all-wheel-drive (AWD) systems. Often, AWD systems do not require the operator to intentionally select this condition. These systems often employ a viscous clutch in the center differential to transfer torque to the drive wheels that are not sensed as slipping. In tight cornering situations and during towing, these AWD systems present a disadvantage. In cornering situations, noise and vibration can result from the AWD system being engaged. While this is not detrimental to the powertrain during short durations, it can be disconcerting to the operator.

Hydraulically actuated torque-coupling assemblies are used in various vehicular drivetrain applications to limit slip and transfer drive torque between a pair of rotary members. In all-wheel drive applications, hydraulically actuated torque-coupling assemblies are used to automatically control the drive torque transferred from a driven member to a non-driven member in response to speed differentiation therebetween. In limited slip applications, couplings are used in association with a differential to automatically limit slip and bias the torque distribution between a pair of rotary members.

Such hydraulic torque-coupling assemblies conventionally use a frictional clutch between the rotary members. The frictional clutch may be selectively actuated by various hydraulic actuator assemblies, which are constructed of elements disposed inside the differential casing. The hydraulic actuator assemblies internal to the differential case often include displacement pumps disposed inside the torque-coupling case and actuated in response to a relative rotation between the torque-coupling case and the output shaft. The displacement pumps are usually in the form of internal gear pumps, such as gerotor pumps adapted to convert rotational work to hydraulic work. In the internal gear pumps, an inner gear having outwardly directed teeth cooperates with an external gear having inwardly directed teeth so that fluid chambers therebetween increase and decrease in volume as the inner and outer gears rotate in a housing. By connecting the inlet and outlet of the device to the proper location along the sides of the gear set, the variable displacement chambers receive and discharge hydraulic fluid so that the device can function as a pump or motor. A shaft or other mechanical device can be connected to either the inner or outer gear depending upon the type of device. The hydraulic actuator assemblies further include a hydraulic piston member for frictionally loading the friction clutch.

While known hydraulic couplings, including but not limited to those discussed above, have proven to be acceptable for various vehicular driveline applications including the AWD systems, such devices are nevertheless susceptible to improvements that may enhance their performance and cost With this in mind, a need exists to develop improved hydraulic couplings and driveline apparatuses that advance the art.

For instance, there is a problem with the current hydraulic torque-coupling assemblies used in the AWD systems such that they do not have a simple on/off capability, which is separate and distinct from the hydraulic pressure supply/control circuit actuating the clutch assemblies.

The current hydraulically actuated torque-coupling assemblies used in the AWD vehicle systems are especially disadvantageous for a two wheel vehicle towing, such as, for instance, the towing with the two front wheels off the ground and tied to a tow truck and the rear two wheels rolling when the tow truck moves. When the motor vehicle equipped with the hydraulically actuated drive axle torque-coupling assembly in the rear axle is towed with two front wheels off the ground and rear two wheels rolling, the speed differential between a propeller shaft and rear axle shafts occurs. As a result of this, the hydraulic pump actuates the drive axle coupling assembly. The drive axle coupling assembly then drivingly couples the rear wheels to the front wheels. As a result, the motor vehicle could be dislocated from the tow truck.

Therefore, it is the intent of this invention to overcome the shortcomings of the prior art by providing an external control of the hydraulic pressure generated within a hydraulically actuated torque-coupling assembly in which the torque-coupling assembly can be selectively enabled or disabled, or set at any intermediate condition by controlling maximum system hydraulic pressure limit. It is the intent of this invention to overcome the shortcomings by providing an external control of the hydraulic pressure generated within a hydraulically actuated torque-coupling assembly in which the friction clutch can either be turned on or off, or set at any intermediate condition by controlling the maximum system hydraulic pressure limit.

SUMMARY OF THE INVENTION

The present invention provides a novel hydraulically actuated torque-coupling assembly providing improved operational capabilities.

The torque-coupling assembly in accordance with the present invention comprises a hydraulic fluid reservoir provided for storing a supply of a hydraulic fluid, a hollow coupling casing rotatable by an outside drive torque, a hydraulic pump located within the coupling casing to generate a hydraulic pressure, a supply passage fluidly connecting the hydraulic fluid reservoir to a suction passage of said hydraulic pump and a venting passage. The venting passage is provided for operatively fluidly connecting the supply passage to an ambient atmosphere for selectively enabling or disabling the hydraulic pump.

The torque-coupling assembly of the present invention is especially advantageous when used as an auxiliary drive axle coupling assembly for a two wheel vehicle towing, such as, for instance, the towing with the two front wheels off the ground and tied to a tow truck and the rear two wheels rolling when the tow truck moves. Upon further study of the specification and appended claims, further features and advantages of this invention will become apparent to those skilled in the art.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

For purposes of the following description, certain terminology is used in the following description for convenience only and is not limiting. The words "right," "left," "down" and "up" designate directions in the drawings to which reference is made. The words "downwardly" and "upwardly" refer to position in a vertical direction relative to a geometric center of the apparatus of the present invention and designated parts thereof. The terminology includes the words above specifically mentioned, derivatives thereof and words of similar import. Additionally, the word "a," as used in the claims, means "at least one."

Figure 1:
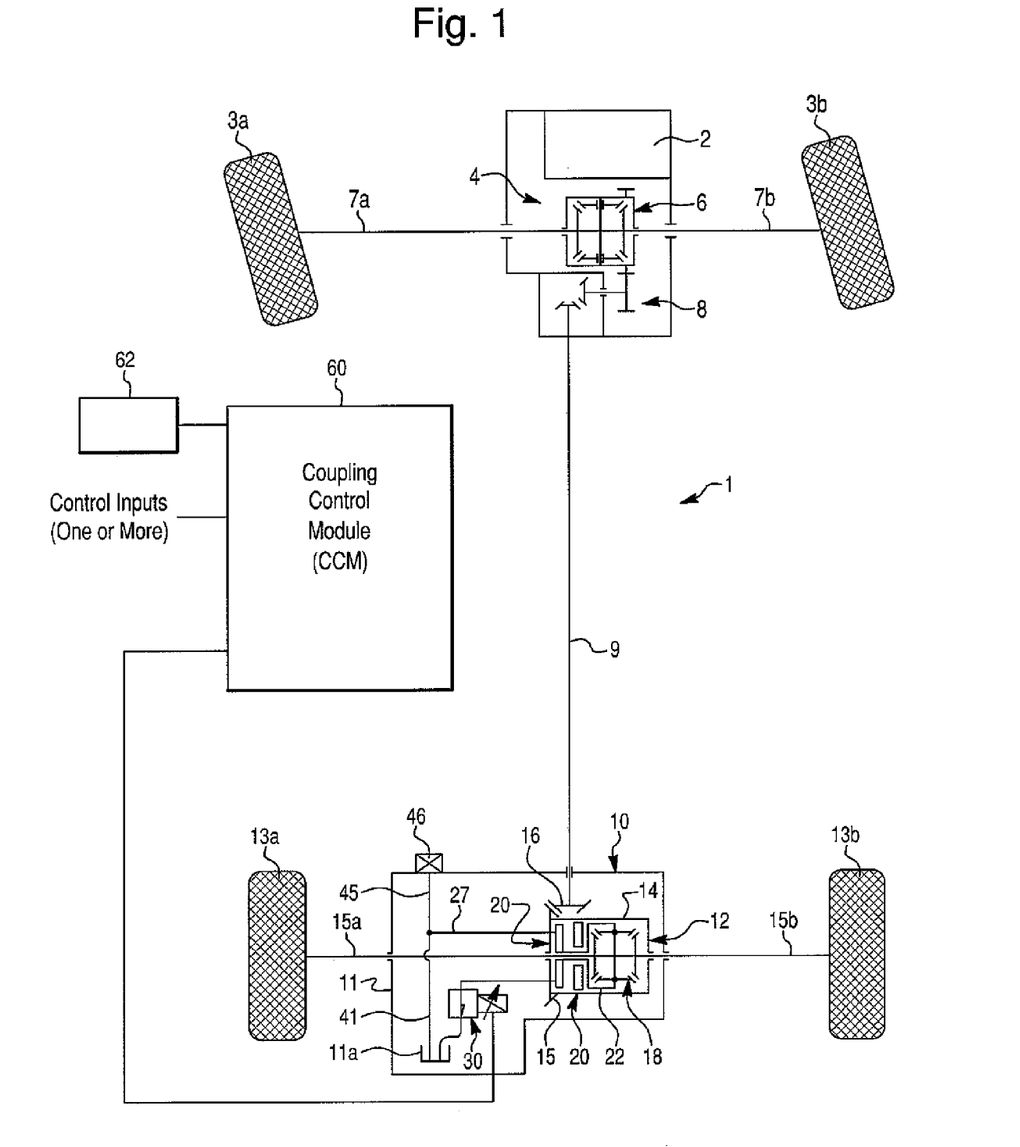
FIG. 1 is a schematic diagram showing a drivetrain of an all-wheel drive motor vehicle including a torque-coupling assembly in accordance with a preferred embodiment of the present invention for an auxiliary drive axle of the all-wheel drive motor vehicle.

FIG. 1 schematically depicts a drivetrain 1 of an all-wheel drive motor vehicle in accordance with the preferred embodiment of the present invention. The drivetrain 1 comprises an internal combustion engine 2 mounted to a front end of the motor vehicle and coupled to a transaxle 4, a power transfer unit 8, a propeller shaft 9 and a selectively operable auxiliary drive axle assembly 10. The transaxle 4 includes a front differential 6 rotated by a drive torque from the engine 2, and two front axle shafts 7a and 7b outwardly extending from the front differential 6 and drivingly coupled to front wheels 3a and 3b, respectively.

Figure 2:
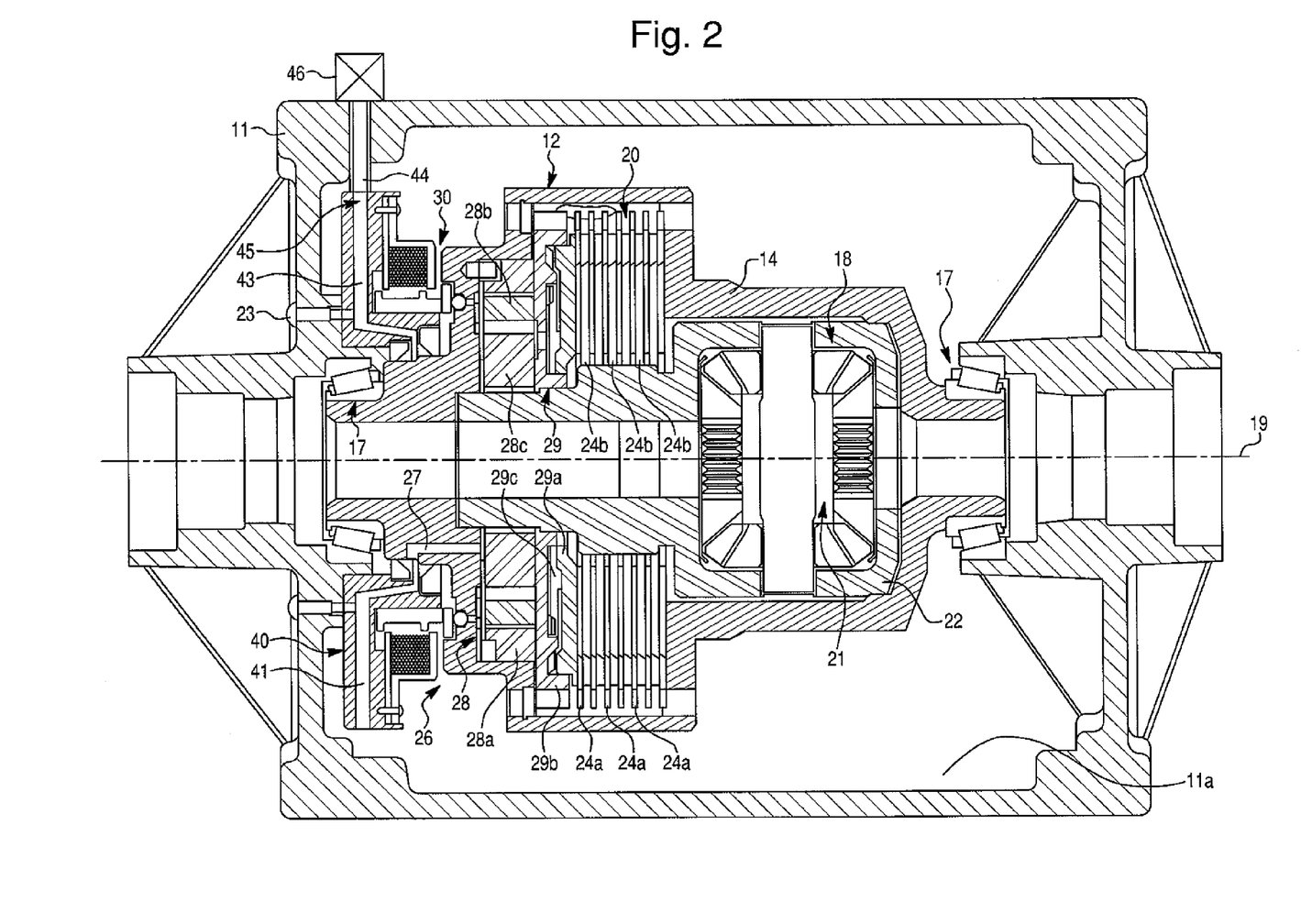
FIG. 2 is a sectional view of the torque-coupling assembly in accordance with the preferred embodiment of the present invention.
Figure 3:
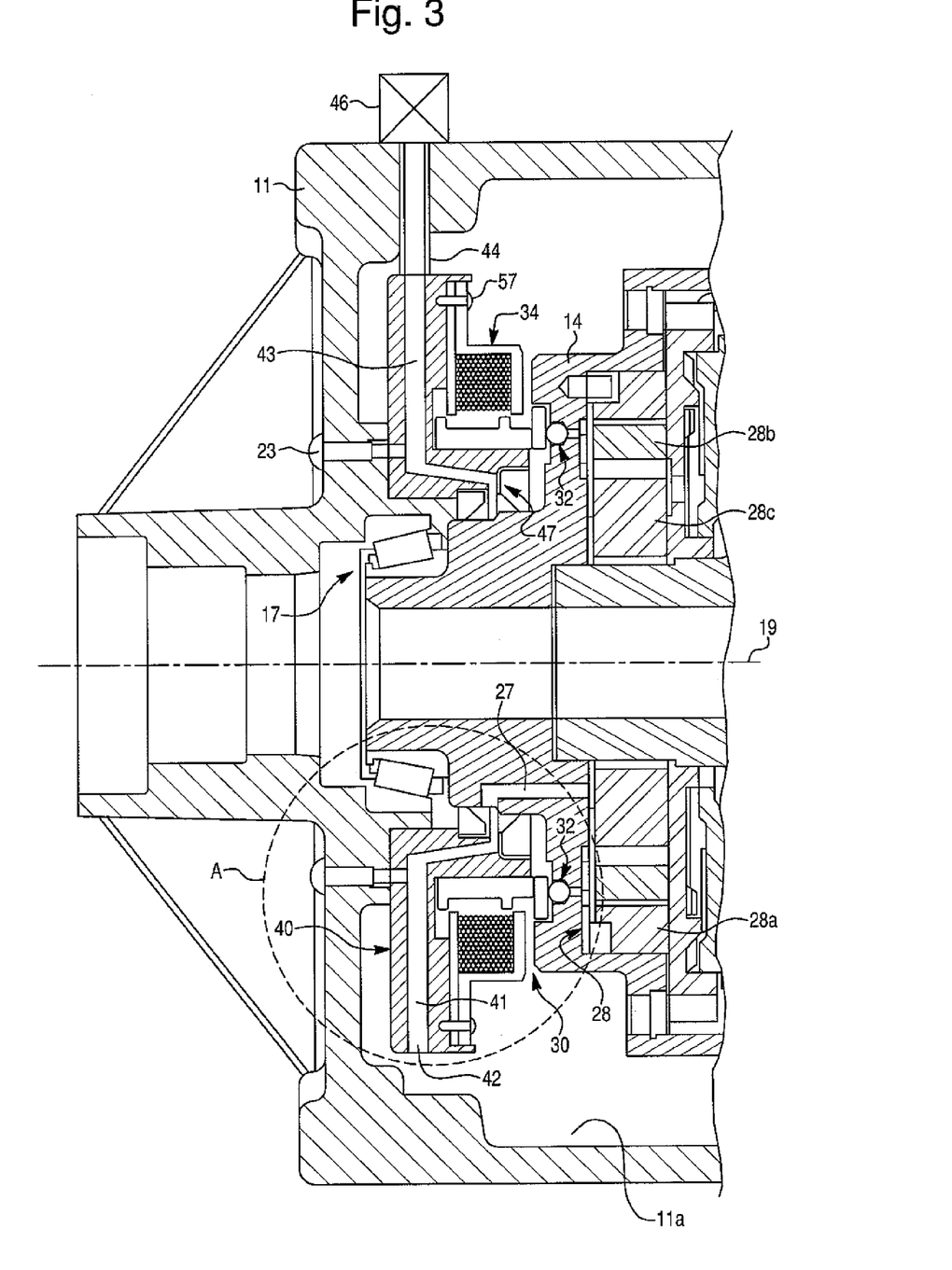
FIG. 3 is an enlarged partial sectional view of the torque-coupling assembly in accordance with the preferred embodiment of the present invention shown in FIG. 2.

The auxiliary drive axle assembly 10 includes a hydraulically operated torque-coupling assembly in the form of a selectively operable auxiliary drive axle coupling assembly 12 disposed in an axle, or coupling, housing 11. The coupling housing 11 defines a hydraulic fluid reservoir 11a therewithin (as shown in FIGS. 1-3) for storing an appropriate amount of a lubricant hydraulic fluid provided for lubrication of components of the drive axle assembly 10 and operation of the coupling assembly 12. The axle coupling assembly 12 includes a hollow coupling casing 14 rotatably supported within the axle housing 11 and driven by a final drive pinion gear 16 transmitting a drive torque from the engine 2 to a ring gear 15 through the transaxle 4, the power transfer unit 8 and the propeller shaft 9. The ring gear 15 is bolted or other wise secured to the coupling casing 14.

The axle coupling assembly 12 operatively couples the propeller shaft 9 to the rear wheels 13a and 13b through a limited slip device and a differential assembly 18 disposed within the coupling casing 14. Preferably, the limited slip device is in the form of a hydraulically actuated friction clutch assembly 20 selectively connecting the coupling casing 14 to the differential assembly 18.

FIG. 2 of the drawings illustrates in detail the preferred arrangement of the auxiliary drive axle coupling assembly 12 in accordance with the third exemplary embodiment of the present invention. The coupling casing 14 is rotatably supported in the axle housing 11 through roller bearings 17, and defines a central axis 19. The differential assembly 18 includes a differential gear mechanism 21 disposed inside a differential case 22. Preferably, the friction clutch assembly 20 is a hydraulically actuated multi-plate friction clutch assembly that selectively frictionally couples the differential case 22 to the coupling casing 14. However, other appropriate types of hydraulically actuated clutches are within the scope of the present invention. The multi-plate friction clutch assembly 20, well known in the prior art, includes sets of alternating outer friction plates 24a and inner friction plates 24b. Conventionally, an outer circumference of the outer friction plates 24a is provided with projections that non-rotatably engage corresponding grooves formed in the coupling casing 14. Similarly, an inner circumference of the inner friction plates 24b is provided with projections that non-rotatably engage corresponding grooves formed in the differential case 22. At the same time, both the outer friction plates 24a and the inner friction plates 24b are slideable in the axial direction. The clutch plates 24a frictionally engage the clutch plates 24b to form a torque coupling arrangement between the coupling casing 14 and the differential case 22.

A hydraulic clutch actuator 26 selectively actuates the friction clutch assembly 20. Preferably, the hydraulic clutch actuator 26 includes a speed sensitive hydraulic displacement pump 28 providing a pressurized hydraulic fluid, a piston assembly 29 for axially loading the clutch assembly 20, a variable pressure relief valve assembly 30 for selectively controlling a discharge pressure of the pump 28 and, subsequently, the clutch assembly 20, and a hydraulic fluid plumbing (manifold) member 40 non-rotatably mounted to the coupling housing 11 for providing fluid communication between the hydraulic fluid reservoir 11a and the hydraulic pump 28. When energized, the solenoid-operated valve assembly 30 is capable of modulating a pump discharge pressure in a variable range from a minimum pressure to a maximum pressure, thereby selectively and variably controlling a drive torque applied the differential case 22 in a range from a minimum torque value to a maximum torque value.

The variable pressure relief valve assembly 30 is operated by an electromagnetic (preferably, solenoid) actuator electronically controlled by a coupling control module (CCM) 60 based on one or more vehicle parameters as control inputs, such as a vehicle speed, a wheel speed difference, vehicle yaw rate, a vehicle lateral acceleration, a steering angle, an engine throttle position, a brake application, an ice detection, a moisture detection, a vehicle driveline configuration, a vehicle yaw stability control system and an anti-lock brake system/traction control system (ABS/TCS). The CCM 60 is also connected to a source of an electric power supply, such as an electric storage battery 62 mounted on the motor vehicle.

The speed sensitive hydraulic displacement pump 28 disposed within the coupling casing 14 actuates the clutch assembly 20 when the relative rotation between the coupling casing 14 (or the propeller shaft 9) and the differential case 22 (or the output axle shafts 15a and 15b) occurs, as shown in FIG. 1. It will be appreciated that a hydraulic pressure generated by the pump 28 is substantially proportional to a rotational speed difference between the differential case 22 and the coupling casing 14. Preferably, the hydraulic displacement pump 28 employed to provide pressurized hydraulic fluid to actuate the clutch assembly 20 is a bi-directional gerotor pump. The gerotor pump 28 includes an outer ring member 28a, an outer rotor 28b, and an inner rotor 28c. The inner rotor 28c is drivingly coupled (i.e., keyed or splined) to the differential case 22, while the outer ring member 28a is secured (i.e., keyed or splined) to the coupling casing 14. The inner rotor 28c has a plurality of external teeth that rotate concentrically relative to the differential case 22 about the common central axis 19. The outer rotor 28b includes a plurality of internal teeth and has an outer circumferential edge surface that is journally rotatably supported within a circular internal bore formed in the outer ring member 28a. Preferably, the inner rotor 28c has one less tooth than the outer rotor 28b and when relative rotation between the inner rotor 28c and the outer ring member 28a occurs, it causes eccentric rotation of the outer rotor 28b, which can freely rotate within the outer ring member 28a eccentrically with respect to the inner rotor 28c, thus providing a series of decreasing and increasing volume fluid pockets by means of which fluid pressure is created. Therefore, when relative motion takes place between the coupling casing 14 and the differential case 22, the gerotor pump 28 generates hydraulic fluid pressure. However, it will be appreciated that any other appropriate type of hydraulic pump generating the hydraulic pressure in response to the relative rotation between the coupling casing 14 and the differential case 22 is within the scope of the present invention.

The piston assembly 29 including a hydraulically actuated piston 29a disposed within a piston housing 29b, serves to compress the clutch assembly 20 and retard any speed differential between the coupling casing 14 and the differential case 22, or any speed differential between the propeller shaft 9 and the axle shafts 15a, 15b, shown in FIG. 1. This results in a retardation of any speed differential between the coupling casing 14 and the differential case 22. Pressurized hydraulic fluid to actuate the piston 29a and engage the clutch assembly 20 is provided by the gerotor pump 28. In such an arrangement, when a speed difference between the coupling casing 14 and the differential case 22 exists, the hydraulic fluid is drawn into the pump 28 from the hydraulic fluid reservoir 11a through a suction passage (or port) 27 formed in the coupling casing 14. The gerotor pump 28 pumps the pressurized fluid into a piston pressure chamber 29c defined between the piston 29a and the piston housing 29b to actuate the clutch assembly 20. As the speed difference increases, the hydraulic fluid pressure increases. The pressurized fluid in the piston pressure chamber 29c creates an axial force upon the piston 29a for applying a compressive clutch engagement force on the clutch assembly 20, thereby transferring drive torque from the coupling casing 14 to the differential case 22. The amount of torque transfer (i.e., the torque ratio or split) is progressive and continuously variable and is proportional to the magnitude of the clutch engagement force exerted by piston 29a on the clutch assembly 20 which, in turn, is a function of the fluid pressure within the piston chamber 29c. Moreover, the magnitude of the fluid pressure within piston chamber 29c, as delivered thereto by the hydraulic pump 28, is largely a function of the speed differential between the coupling casing 14 and the differential case 22.

The plumbing member 40 is non-rotatably secured to the coupling housing 11 through at least one pin 23 and is rotatable relative to the coupling casing 14. The plumbing member 40 includes a supply conduit, or passage, 41 and a venting conduit 43. The supply passage 41 fluidly connects the hydraulic fluid reservoir 11a (shown in FIGS. 1-3) to a suction port of the hydraulic pump 28 through a suction passage 27. As illustrated in the accompanying drawings, the supply passage 41 extends substantially downwardly and is at least partially submersed in the hydraulic fluid reservoir 11a. In other words, an inlet opening 42 in a distal end of the supply passage 41 is submersed into the hydraulic fluid reservoir 11a.

The supply passage 41 is fluidly connected to the suction passage 27 in the coupling casing 14 through a rotary seal assembly 47 shown in FIG. 3. As illustrated in detail in FIG. 6, the rotary seal assembly 47 includes first and second seal rings 47 and 47b, respectively, non-rotatably secured to the plumbing member 40 by any appropriate means, such as press-fitting. The seal rings 47 and 47b are secured to the plumbing member 40 in an axially spaced relationship. Innermost distal ends of the seal rings 47a and 47b are provided with elastomeric seals 48a and 48b, respectively, slidingly engaging the coupling casing 14 so as to form a substantially annular hydraulic chamber 49 between the seal rings 47 and 47b. As illustrated in detail in FIG. 6, the hydraulic chamber 49 fluidly connects the supply passage 41 with the suction passage 27 and the venting conduit 43.

The venting conduit 43 fluidly connects the supply passage 41 to an ambient atmosphere through a venting tube 44 connected to a distal end of the venting conduit 43 at a proximal end thereof. A distal end of the venting tube 44 extends to the coupling housing 11 and is open to the ambient atmosphere outside the coupling housing 11, as shown in FIGS. 1-3. The venting conduit 43 in combination with the venting tube 44 defines a venting passage 45 of the torque-coupling assembly 12, as shown in FIGS. 1 and 2. Moreover, the venting passage 45 is in fluid communication with the supply passage 41 through the hydraulic chamber 49 of the rotary seal assembly 47. Alternatively, the venting conduit 43 may extend to the coupling housing 11 and open to the ambient atmosphere outside the coupling housing 11. In such an arrangement, the venting passage 45 is defined solely by the venting conduit 43.

Figure 4:
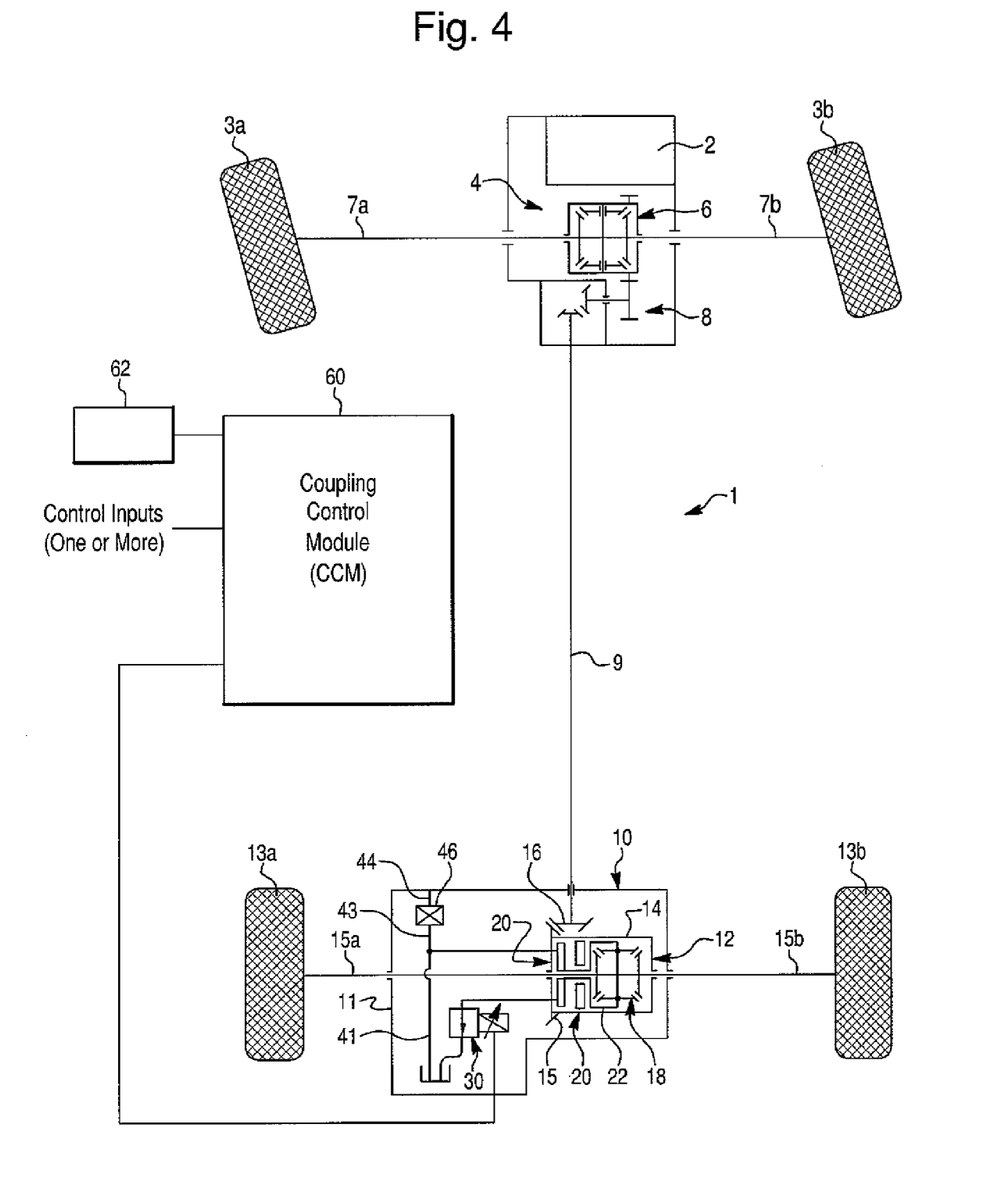
FIG. 4 is a schematic diagram of a drivetrain of an all-wheel drive motor vehicle showing an alternative arrangement of a selector valve of the torque-coupling assembly of the present invention.
Figure 5:
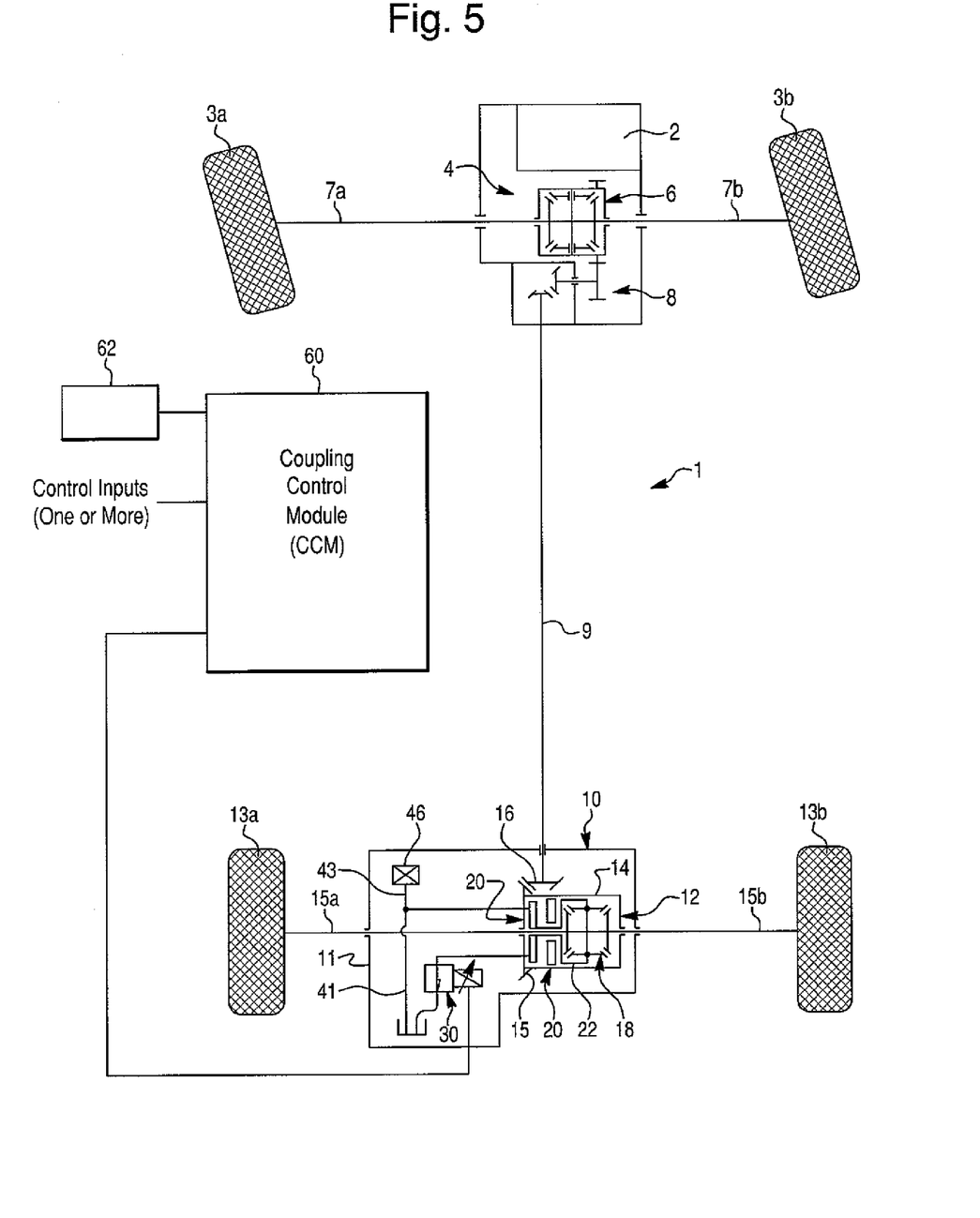
FIG. 5 is a schematic diagram of a drivetrain of an all-wheel drive motor vehicle showing another alternative arrangement of the selector valve and a venting passage of the torque-coupling assembly of the present invention.

The venting passage 45 is provided with a selector valve 46 selectively switchable between a closed position and an open position. Preferably, as illustrated in FIGS. 1-3, the selector valve 46 is mounted to the distal end of the venting tube 44 (hence, to a distal end of the venting passage 45) outside the coupling housing 11. Alternatively, as illustrated schematically in FIG. 4, the selector valve 46 may be mounted inside the coupling housing 11 between the venting conduit 43 and the venting tube 44. Further alternatively, the selector valve 46 may be mounted at the distal end of the venting conduit 43. In this embodiment, as illustrated schematically in FIG. 5, the venting tube 44 is omitted and the venting passage is defined solely by the venting conduit 43 and is open to the atmosphere inside the coupling housing 11. In the closed position of the selector valve 46, the venting passage 45 is sealed by the selector valve 46 so as to allow the hydraulic pump 28 to draw the hydraulic fluid from the hydraulic fluid reservoir 11a through the supply passage 27. In the open position of the selector valve 46, the venting passage 45 is open to the ambient atmosphere. Consequently, the supply passage 41 is vented to the ambient atmosphere through the venting passage 45, as the venting passage 45 is in fluid communication with the supply passage 41. As a result, in the open position of the selector valve 46 the hydraulic pump 28 is prevented from drawing the hydraulic fluid from the hydraulic fluid reservoir 11a through the supply passage 41 and generate pressurized hydraulic pressure that actuates the friction clutch assembly 20, thus effectively disabling the drive axle coupling assembly 12.

Such an arrangement of the auxiliary drive axle coupling assembly 12 is especially advantageous for a two wheel vehicle towing, such as, for instance, the towing with the two front wheels off the ground and tied to a tow truck and the rear two wheels rolling when the tow truck moves. When the motor vehicle equipped with the drive axle coupling assembly 12 in the rear axle is towed with the two front wheels 3a, 3b off the ground and the rear two wheels 13a, 13b rolling, the speed differential between the propeller shaft 9 and the axle shafts 15a, 15b occurs. As a result of this, if the venting passage 45 is closed by the selector valve 46, the hydraulic fluid is drawn into the pump 28 from the hydraulic fluid reservoir 11a through the supply passage 41 in the plumbing member 40, the rotary seal assembly 47 and through the suction passage 27. The gerotor pump 28 then pumps the pressurized fluid into the piston pressure chamber 29c. Subsequently, the pressurized fluid in the piston pressure chamber 29c creates an axial force upon the piston 29a for loading the clutch assembly 20, thus actuating the drive axle coupling assembly 12. The drive axle coupling assembly 12 then drivingly couples the rear wheels 13a, 13b to the front wheels 3a, 3b. As a result, the motor vehicle could be dislocated from the tow truck. However, if the selector valve 46 is in the open position, the passage 41 is vented to the ambient atmosphere through the venting passage 45, thus the hydraulic pump 28 is prevented from drawing the hydraulic fluid from the hydraulic fluid reservoir 11a through the supply passage 41 and generate pressurized hydraulic pressure that actuates the friction clutch assembly 20. As a result, the torque generated by the drive axle torque-coupling assembly 12 is substantially eliminated, thus allowing for two wheel towing.

It will be appreciated that the selector valve 46 may be in appropriate form known in the art, such as rotary valve, butterfly valve, needle valve, flap valve, etc. The selector valve 46 may be manually operated as well as electrically controlled. Preferably, the selector valve 46 is in the form of a normally closed by a spring bias solenoid operated on-off valve.

As noted above, in order to control the fluid pressure within the piston pressure chamber 27c and, subsequently, the output torque distribution of the rear drive axle coupling assembly 12, the hydraulic clutch actuator 26 is provided with the variable pressure relief valve assembly 30. The variable pressure relief valve assembly 30 according to the present invention is in the form of an electromagnetic valve assembly and comprises at least one pressure relief check valve 32 controlled by a single electromagnetic actuator 34 that may be any appropriate electromagnetic device well known in the art, such as solenoid. Preferably, as illustrated in FIGS. 2 and 3, the variable pressure relief valve assembly 30 comprises two substantially identical pressure relief check valves 32 controlled by the single electro-magnetic actuator 34. It will be appreciated that more or less than two pressure relief valves 32 may be employed depending upon the particular design and application.

Figure 6:
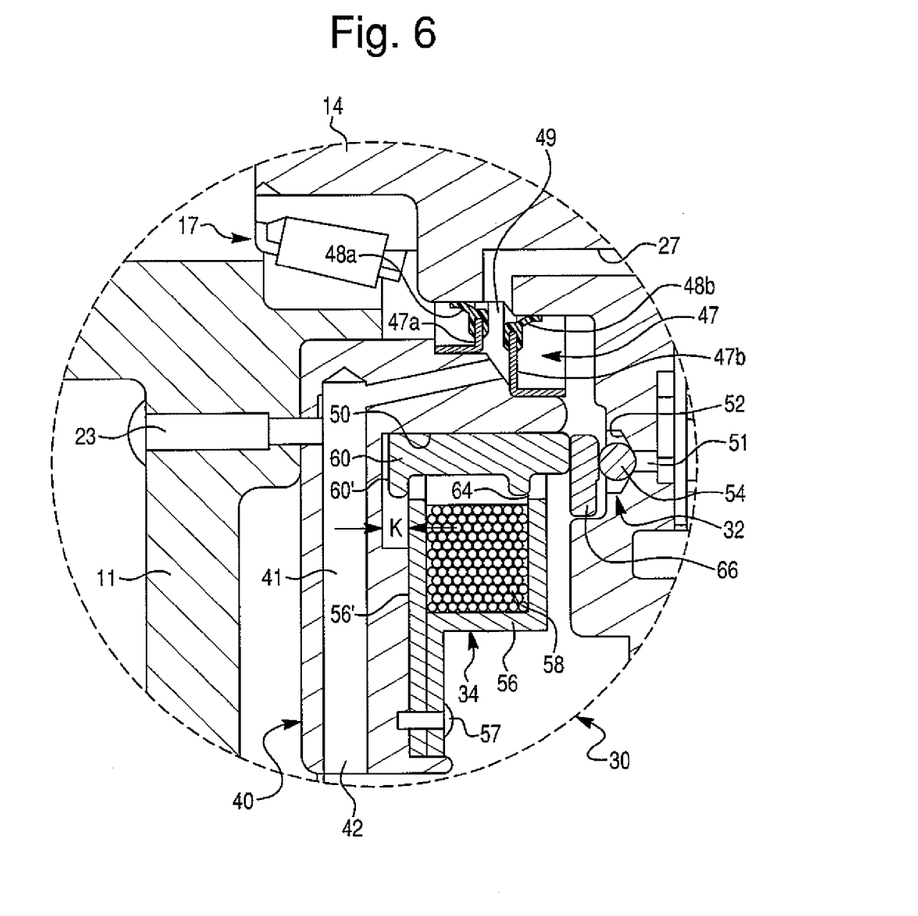
FIG. 6 is an enlarged partial sectional view of a variable pressure relief valve assembly shown in a circle 'A' in FIG. 3.

Preferably, as illustrated in detail in FIG. 6, the pressure relief valves 32 provided for controlling the torque-coupling assembly 12 are substantially identical, thus only one pressure relief check valve 32 will be described in detail herein below. The pressure relief valve 32 comprises a fluid relief passageway 51 that is in fluid communication with the piston pressure chamber 29c, a substantially conical valve seat 52 that is in open communication with the fluid relief passageway 51, and a spherical valve closure member 54 adapted to seat in the valve seat 52 for sealing the fluid relief passageway 51. It will be appreciated that the valve closure member 54 may be in any appropriate form other than spherical, such as conical. The valve seat 52 is complementary to the shape of the valve closure member 54 and is formed in the coupling casing 14. The valve closure member 54 is movable between a closed position when the valve closure member 54 engages the valve seat 52 (as shown in FIG. 6), and an open position when the valve closure member 54 is axially spaced from the valve seat 52.

The electro-magnetic actuator 34 comprises a substantially annular coil housing 56, a coil winding 58 wound within the coil housing 56, and a substantially annular armature 60 axially movable in the direction of the axis 11. The armature 60 is coaxial to the coil winding 58 and is radially spaced from the coil housing 56, thus defining an air gap 64. The coil housing 56 is non-rotatably secured to the plumbing member 40 substantially coaxially to the axis 11 by fasteners 57. The plumbing member 40, in turn, is non-rotatably secured to the coupling housing 11. The coil housing 56 is preferably formed of a two-piece magnetically permeable material, such as conventional ferromagnetic materials. Alternatively, the coil housing 56 may be formed of a plurality of laminations of the magnetically permeable material. In the exemplary embodiment illustrated in FIGS. 2 and 3, the armature 60 is disposed inside the coil winding 58 of the electro-magnetic actuator 34. Alternatively, the armature 60 may be disposed outside the coil winding 58. Preferably, the annular armature 60 is non-rotatably mounted on a support hub portion 50 of the plumbing member 40 for axial movement in the direction of the axis 19. Alternatively, the annular armature 60 may be rotatably mounted to of the plumbing member 40.

The valve closure member 54 is urged and held in place by against the valve seat 52 by an actuator plate 66. In turn, the actuator plate 66 is adapted to engage the armature 60 of the electro-magnetic actuator 34 disposed inside the coil winding 58 thereof. Preferably, the actuator plate 66 is in the shape of an annular ring and is made of any appropriate non-magnetic material well known to those skilled in the art. Furthermore, the actuator plate 66 is secured to the armature 60 by any appropriate means known in the art, such as threaded connectors, adhesive bonding, etc. Alternatively, the actuator plate 66 may be in the shape of an annular segment of approximately 15° attached to the armature 60.

When electrical current is supplied to the coil winding 58, a magnetic flux is caused to flow through the armature 60. The magnetic flux creates an axial force that axially displaces the armature 60 relative to the coil winding 58. The armature 60 moves the actuator plate 66, which, in turn, urges the valve closure members 54 upon the valve seats 52 with a predetermined axial retaining force that is a function of the electrical current supplied to the coil winding 58. It will be appreciated by those skilled in the art that the pressurized hydraulic fluid will not flow through the pressure relief valves 32 until the hydraulic pressure generated by the gerotor pump 28 results in a reaction force larger than the axial retaining force exerted to the armature 60 by the magnetic flux generated by the coil winding 58, thereby pushing the valve closure members 54 out of the valve seat 52. Therefore, such an arrangement creates a relief valve with a release pressure that is a function of the current supplied to the coil winding 58, and provides a predetermined pressure limit in the hydraulic system. Thus, the variable pressure relief valve assembly 30 selectively sets the release pressure of the pressure relief valves 32 based on the magnitude of the electrical current supplied to the coil winding 58 and, subsequently, defines the magnitude of the pressure within the piston pressure chamber 27c.

When a maximum current is applied to the coil winding 58 of the solenoid actuator 34, the retaining force of the pressure relief valves 32 is at its maximum, thus a maximum release pressure is provided by the pressure relief valves 32. In this configuration, the maximum pressure attainable within the piston pressure chamber 27c is sufficient to fully actuate the friction clutch assembly 20 which results in providing the limited slip function in the torque-coupling assembly 12, and the limited slip feature is in the fully "ON" condition.

The pressure limit of the pressure relief valves 32, i.e. the release pressure of the pressure relief valves 32, can be adjusted by controlling the current applied to the coil winding 58 of the electromagnetic actuator 34. As less current is applied to the coil winding 58, less axial retaining force is exerted to the relief valves 32, thus the less is the release pressure provided by the relief valves 32. This results in an adjustment mechanism for lowering the maximum system pressure attainable within the piston pressure chamber 29c.

When a minimum current is applied to the coil winding 58 of the solenoid actuator 34, the retaining force of the pressure relief valve 32 is at its minimum, thus a minimum release pressure is provided by the relief valve 32. In this configuration, the limited slip feature is in the fully "OFF" condition in that the maximum pressure which can be obtained in the piston pressure chamber 29c is not high enough to engage the friction clutch assembly 20, essentially disabling the torque-coupling assembly 12.

In between the "ON" and "OFF" conditions of the torque-coupling assembly 12 the release pressure of the relief valves 32 may be set at any value by modulating the current applied to the coil winding 58 of the solenoid actuator 34. This provides the torque-coupling assembly 12 with a variable maximum pressure limit in which the amount of the limited slip available to the torque-coupling assembly 12 can be limited and optimized to match various vehicle operating conditions. This provides an opportunity to dynamically control the hydraulic pressure for traction enhancement. For example, if the release pressure is set at a low value, a control system can be used to sense wheel speeds or speed differences and allow for increased hydraulic pressure. The increase in pressure available may be a function of the speed difference. This will result in an optimized amount of limited slip between the fully "ON" and "OFF" conditions.

It will be appreciated by those skilled in the art that the armature 60 may have any appropriate shape in the cross-section. Preferably, as illustrated in detail in the exemplary embodiment of FIG. 6, the armature 60 has a generally U-shaped cross-section with magnetic poles facing the coil winding 58, similar to those used in reluctance electric motors. Moreover, the mutual geometric arrangement of the armature 60 and the coil housing 56 is such as to maintain a substantially constant axial force applied upon the valve closure members 54 by the electromagnetic actuator 34 as it moves from its closed to open position. This is achieved by maintaining a proper "off-set" between the armature 60 and the coil housing 56 (and, consequently, the coil winding 58). The term "off-set" is determined here as an amount of misalignment between the armature 60 and the coil housing 56, or a distance k between an outward face 56' of the coil housing 56 and an outward face 60' of the armature 60, as illustrated in detail in FIG. 6.

Figure 7:
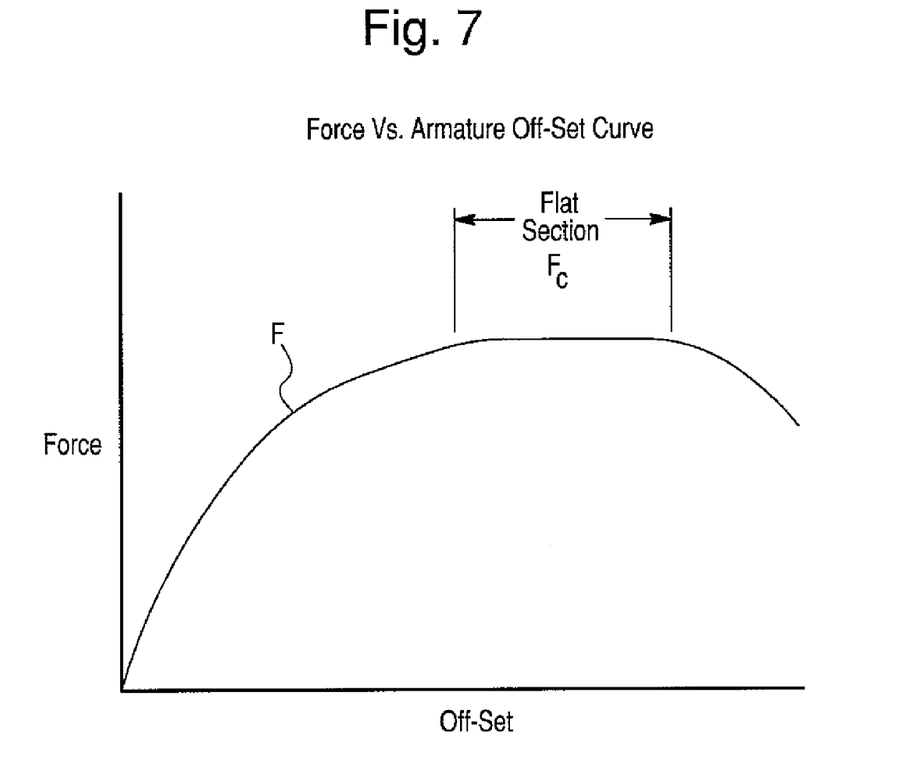
FIG. 7 is a graph showing an axial force applied upon a valve closure member by an electro-magnetic actuator as a function of "off-set" between a coil housing and an armature.

FIG. 7 depicts a graph showing the axial force applied upon the valve closure members 54 by the electromagnetic actuator 34 as a function of the "off-set" distance k while a constant magnitude of the electric current is supplied to the coil winding 58. The graph is in the form of a curved line F having a substantially "flat" section $F_C$ wherein the axial force varies insignificantly with respect to the "off-set" distance k. However, operation outside of this section $F_C$ results in an abrupt change of the axial force. Thus, while the electromagnetic actuator 34 of the relief valve assembly 30 is operated in the "flat" section $F_C$, the axial force applied upon the valve closure members 54 by the electro-magnetic actuator 34 is substantially constant as it moves from its closed to open position, and is a function of the electrical current supplied to the coil winding 58. On the other hand, operation outside of this "flat" section $F_C$ results in the axial force being a function of both the current and the "off-set" distance k that would make control of the variable pressure relief valve much more difficult requiring a closed loop feedback as to the valve's "off-set". Other, more traditional solenoid pole designs do not provide this "flat" section in the axial force versus "off-set" distance curve.

For the above described reason, the electro-magnetic actuator 34 in accordance with the preferred embodiment of the present invention is arranged to provide the "off-set" distance k between the coil housing 56 and the armature 60 within the "flat" section $F_C$ of the axial force versus "off-set" distance curve so as to ensure that the axial force applied upon the valve closure members 54 by the electro-magnetic actuator 34 is substantially constant as it moves from its closed to open position, and is a function only of the electrical current supplied to the coil winding 58.

The dual pressure relief valve arrangement of the present invention allows for reduced drag torque when there is pumping action but no solenoid actuation by having two (or multiple) fluid relief passageways instead of one, and simplifies manufacturing and assembly of the pressure relief valve assembly 30 by not requiring pivot pin(s) necessary for orienting and guiding the armature of the electro-magnetic actuator 34 in case of a single pressure relief valve arrangement. Moreover, the dual pressure relief valve arrangement provides a higher resultant force over the valve closure members 54 than in the single pressure relief valve arrangement. Even though there are two valve closure members being actuated, the net force over the valve closure members is at least 5% higher than in the single pressure relief valve arrangement with a pivot point.

The dual fluid relief passageway 51 also increases the flow cross sectional area between high and low pressure sides of the hydraulic clutch actuator allowing for large flow, when compared to a single fluid relief passageway, therefore reducing the pressure for the same flow when the electromagnetic actuator 34 is not actuated.

As illustrated in FIG. 1, the variable pressure relief valve assembly 30 is operated by an electromagnetic (preferably, solenoid) actuator electronically controlled by a coupling control module (CCM) 60 based on one or more vehicle parameters as control inputs, such as a vehicle speed, a wheel speed difference, a vehicle yaw rate, a vehicle lateral acceleration, a steering angle, an engine throttle position, a brake application, an ice detection, a moisture detection, a vehicle driveline configuration, a vehicle yaw stability control system and an anti-lock brake system/traction control system (ABS/TCS). The CCM 60 is also connected to a source of an electric power supply, such as the electric storage battery 62 mounted on the motor vehicle.

When energized, the solenoid-operated valve assembly 30 is capable of modulating a pump discharge pressure in a variable range from a minimum pressure to a maximum pressure, thereby selectively and variably controlling a drive torque applied to the output axle shafts 15*a* and 15*b* in a range from a minimum torque value to a maximum torque value. Thus, the torque coupling in accordance with third exemplary embodiment of the present invention allows infinitely variable torque distribution between the main axle and the auxiliary axle.

Therefore, the selectively operable auxiliary drive axle coupling assembly for the AWD motor vehicles in accordance with the present invention represents a novel arrangement of the hydraulically actuated torque-coupling assembly provided with a venting passage controlled by a selector valve allowing to selectively disabling the drive axle coupling assembly, such as during two wheel vehicle towing, and with an electro-magnetic actuator for activating a variable pressure relief valve for allowing selective actuation of the auxiliary drive axle and infinitely variable torque distribution between the main and auxiliary axles of the AWD motor vehicle.

It is to be understood that while the present invention is described in relation to a selectively operable auxiliary drive axle coupling assembly, the present invention is equally suitable for use in other hydraulically actuated torque-coupling assemblies, such as speed sensitive limited slip differentials and friction torque-coupling mechanisms for various drive-train apparatuses.

The foregoing description of the preferred embodiment of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A torque-coupling assembly comprising:
a hydraulic fluid reservoir provided for storing a supply of a hydraulic fluid;
a hollow coupling casing to be rotated by an outside drive torque;
a hydraulic pump located within said coupling casing to generate a hydraulic pressure;
a supply passage fluidly connecting said hydraulic fluid reservoir to a suction passage of said hydraulic pump; and
a venting passage selectively fluidly connecting said supply passage to an ambient atmosphere;
said supply passage being fluidly connected to said venting passage through an annular hydraulic chamber formed outside said coupling casing.

2. The torque-coupling assembly as defined in claim 1, wherein said venting passage is provided with a selector valve selectively switchable between a closed position when said venting passage is sealed by said selector valve so as to allow said pump to draw the hydraulic fluid from said hydraulic fluid reservoir through said supply passage, and a venting position when said venting passage is open to the ambient atmosphere so as to vent said supply passage to the ambient atmosphere through said venting passage in order to prevent said pump to draw the hydraulic fluid from said hydraulic fluid reservoir through said supply passage; said selector valve being spaced from said annular hydraulic chamber.

3. The torque-coupling assembly as defined in claim 2, wherein said selector valve is manually or electrically controlled.

4. The torque-coupling assembly as defined in claim 2, wherein said selector valve is a normally closed solenoid operated on-off valve.

5. The torque-coupling assembly as defined in claim 1, wherein a distal end of said supply passage is submerged in the hydraulic fluid in said hydraulic fluid reservoir.

6. The torque-coupling assembly as defined in claim 1, further comprising a coupling housing rotatably supporting said coupling casing.

7. The torque-coupling assembly as defined in claim 6, wherein said coupling housing defines said hydraulic fluid reservoir provided for storing said supply of the hydraulic fluid.

8. The torque-coupling assembly as defined in claim 1, further comprising a plumbing member including said supply passage formed therethrough; said coupling casing is rotatable relative to said plumbing member.

9. The torque-coupling assembly as defined in claim 8, wherein said supply passage is fluidly connected to said suction passage through a rotary seal assembly provided between said plumbing member and said coupling casing and forming said annular hydraulic chamber.

10. The torque-coupling assembly as defined in claim 9, wherein said venting passage includes a venting conduit formed through said plumbing member, said venting passage is fluidly connected to said supply passage through said rotary seal assembly.

11. The torque-coupling assembly as defined in claim 10, wherein said venting passage further includes a venting tube connected to a distal end of said venting conduit at a proximal end thereof.

12. The torque-coupling assembly as defined in claim 8, further comprising a coupling housing rotatably supporting said coupling casing, wherein said plumbing member is non-rotatably secured to said coupling housing.

13. The torque-coupling assembly as defined in claim 1, wherein said suction passage of said hydraulic pump is formed in said coupling casing.

14. The torque-coupling assembly as defined in claim 1, further comprising a variable pressure relief valve assembly fluidly communicating with said hydraulic pump to selectively control said hydraulic pressure; said variable pressure relief valve assembly includes a valve closure member, a valve seat complementary to said valve closure member and an electro-magnetic actuator generating a variable electromagnetic force so as to selectively vary a release pressure of said pressure relief valve assembly based on a magnitude of an electric current supplied to said electro-magnetic actuator, said valve closure member is movable between a closed position when said valve closure member engages said valve seat and an open position when said valve closure member is axially spaced from said valve seat.

15. The hydraulic coupling assembly as defined in claim 14, wherein said electro-magnetic actuator including a coil winding wound about a coil housing rotatable relative to said casing and an armature radially spaced from said coil housing and axially movable relative thereto in response to a magnetic flux generated by said coil winding when said electrical current is supplied thereto, said armature engages said valve closure member and urges thereof against said valve seat with an axial force determined by said magnitude of said electric current for selectively setting up said release pressure of said valve closure member.

16. The hydraulic coupling assembly as defined in claim 15, wherein said coil housing is mounted substantially coaxially to an axis of rotation of said casing.

17. The hydraulic coupling assembly as defined in claim 16, wherein said armature is substantially annular in shape and is mounted substantially coaxially to said coil housing.

18. The hydraulic coupling assembly as defined in claim 8, further comprising a variable pressure relief valve assembly fluidly communicating with said hydraulic pump to selectively control said hydraulic pressure; said variable pressure relief valve assembly includes at least one valve closure member, at least one valve seat complementary to said at least one valve closure member and an electro-magnetic actuator generating a variable electro-magnetic force so as to selectively vary a release pressure of said pressure relief valve assembly based on a magnitude of an electric current supplied to said electro-magnetic actuator.

19. The torque-coupling assembly as defined in claim 18, wherein said electro-magnetic actuator includes a coil winding wound about a coil housing rotatable relative to said casing and wherein said coil housing is non-rotatably mounted to said plumbing member.

* * * * *